United States Patent [19]

Huber

[11] 4,083,380

[45] Apr. 11, 1978

[54] FLUID VALVE ASSEMBLY

[75] Inventor: William C. Huber, League City, Tex.

[73] Assignee: The United States of America as represented by the Administrator of the National Aeronautics and Space Administration, Washington, D.C.

[21] Appl. No.: 690,816

[22] Filed: May 27, 1976

[51] Int. Cl.² ............................................. F16K 31/12
[52] U.S. Cl. ............................ 137/505.25; 137/625.3; 137/625.38
[58] Field of Search ........... 137/625.3, 625.37, 625.69, 137/505.25, 625.38, 625.48, 625.68, 505.21; 251/324, 63, 325, 127

[56] References Cited

U.S. PATENT DOCUMENTS

| | | | |
|---|---|---|---|
| 1,702,550 | 2/1929 | Stevenson | 137/625.38 X |
| 2,132,030 | 10/1938 | Hunt et al. | 137/625.38 |
| 2,517,061 | 8/1950 | Von Stackelberg | 137/625.11 |
| 3,057,374 | 10/1962 | Gondek | 251/325 X |
| 3,168,111 | 2/1965 | Strauss | 251/121 X |
| 3,338,548 | 8/1967 | Mott | 251/121 |
| 3,472,292 | 10/1969 | Godfrey | 137/505.25 X |
| 3,527,254 | 9/1970 | Mott | 137/625.3 |
| 3,648,969 | 3/1972 | Marquart | 251/63 |
| 3,693,659 | 9/1972 | Parola | 137/625.3 |
| 4,027,923 | 6/1977 | Saito | 137/505.25 X |

*Primary Examiner*—Arnold Rosenthal
*Attorney, Agent, or Firm*—Marvin J. Marnock; John R. Manning; Marvin F. Matthews

[57] ABSTRACT

A valve assembly for controlling the flow of fluids between the inlet and outlet of a fluid valve. The valve assembly may comprise a barrier element disposed within the body of the valve and having a portion which is porous for providing fluid communication between the valve inlet and outlet. The valve assembly may also comprise a sealing element disposed in the valve body and movable, relative to the barrier element between a first position, in which fluid flow through the porous portion of the barrier element is sealingly blocked preventing fluid communication between the valve inlet and outlet, and a second position, in which the porous portion is unblocked, permitting fluid communication between the valve inlet and outlet.

2 Claims, 5 Drawing Figures

FLUID VALVE ASSEMBLY

BACKGROUND OF THE INVENTION

1. Field of the Invention

The present invention pertains to valves. In particular it is directed to valve assemblies for fluid valves. More specifically, it pertains to valve assemblies suitable for use with valves of the pressure or flow regulated type.

2. Description of the Prior Art

Most valves comprise a valve body having an inlet and outlet connected through a passageway which is normally provided with a seat and closure element. When the closure element is engaged with the seat, flow is prevented through the valve. When the closure element is unseated, flow is permitted. Most valve assemblies are normally made up of flat, conical or spherical poppet and seat combinations. Such assemblies inherently present surfaces which result in unbalanced forces on the assembly when fluid is flowing through the valve.

In an effort to overcome the inherent unbalanced pressure forces in ordinary valve assemblies, other approaches have been taken, e.g., curtain-flap valving units and piston metering valving units. Curtain-flap valving units are suitable for operation only at low pressures due to the tendency of the curtain flap material to extrude through the metering orifices. Piston metering valving units do not provide positive seals and low leakage is difficult to achieve.

ORIGIN OF THE INVENTION

The invention described herein was made by an employee of the United States Government and may be manufactured and used by or for the Government of the United States of America for governmental purposes without the payment of any royalties thereon or therefor.

SUMMARY OF THE INVENTION

The present invention was developed to overcome the unbalanced force problems inherent in conventional valve assemblies and without the disadvantages of some of the more unusual approaches such as curtain-flap valve units and piston metering valve units. With the valve assembly of the present invention, balancing of pressure forces and low leakage capabilities are provided for a wide range of inlet and outlet pressures.

The valve assembly of the present invention may comprise a barrier element, a portion of which is porous, disposed in the valve body between its inlet and outlet. The valve assembly also comprises a sealing element disposed in the valve body and movable, relative to the barrier element, between first and second positions. In the first position, fluid flow through the porous portion of the barrier element is sealingly blocked, preventing fluid communication between the inlet and outlet of the valve. In the second position, the porous portion of the barrier element is unblocked, permitting fluid communication between the inlet and outlet of the valve.

The valve assembly of the present invention can be used in simple hand valves, spool valves or any device which meters or controls the pressure of a fluid, whether gas or liquid. However, it is especially suitable for regulator type valves.

In a regulating type valve a stem is normally disposed in a valve body and is connected to some form of pressure regulating means for moving the stem between first and second positions in response to pressures within the valve body. In such an application, one of the barrier elements and sealing elements is carried by the stem for movement therewith while the other of the barrier and sealing elements is stationarily affixed within the valve body. If the barrier element is carried by the stem, the stem may be tubular and provided with a section of porous walls. If the sealing element is carried on the stem, the barrier element may comprise a tubular member surrounding the stem and having a section of porous walls.

The use of a porous material in the barrier element of the valve assembly of the present invention provides a means of controlling fluid flow with substantially balanced forces on the valving element within a wide range of pressures. The use of such a porous material with a sealing element to control fluid flow, while minimizing unbalanced pressure forces, is unique. Other objects and advantages of the invention will be apparent from the description which follows when read in conjunction with the accompanying drawings.

DESCRIPTION OF PREFERRED EMBODIMENTS

Figure 1:
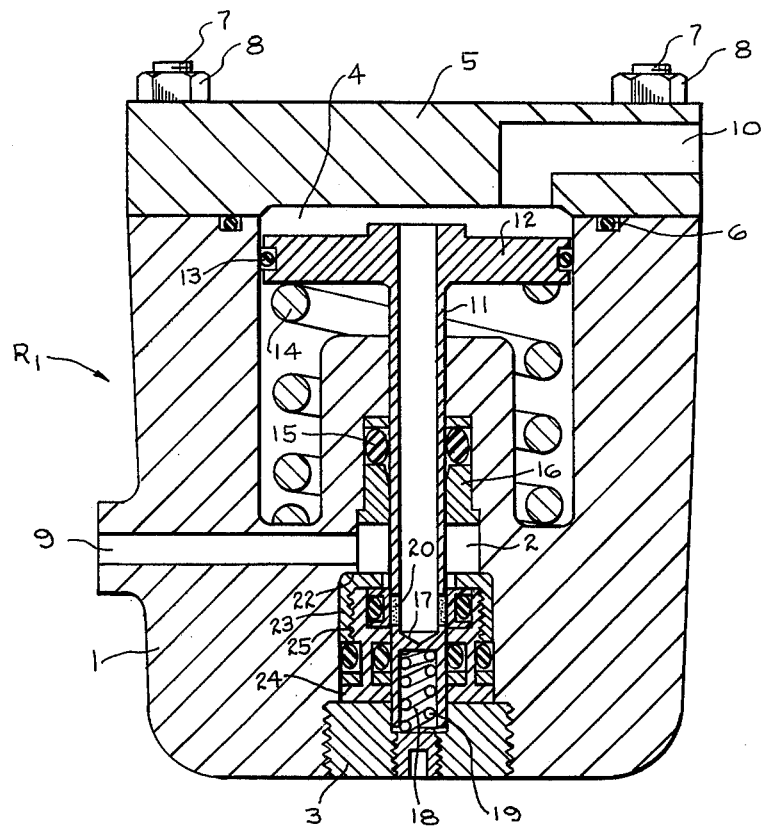
FIG. 1 is an elevation view, in section, of a piston-type regulator utilizing a valve assembly according to a preferred embodiment of the invention.
Figure 2:
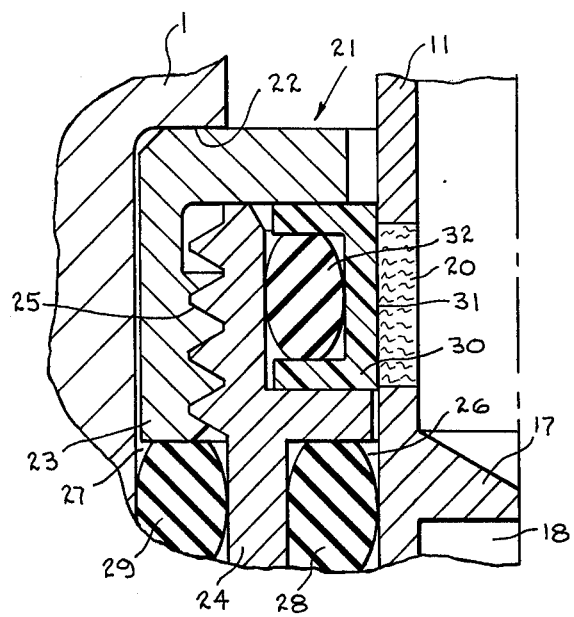
FIG. 2 is a detailed sectional view of the valve assembly utilized in the regulator of FIG. 1, illustrating the valve assembly in its first or closed position.
Figure 3:
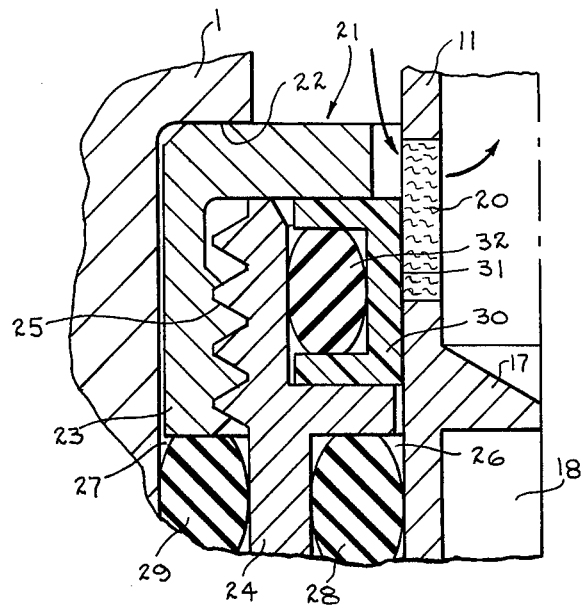
FIG. 3 is a detailed sectional view, similar to FIG. 1, but showing the valve assembly in a second or open position.

Referring first to FIGS. 1-3, a preferred embodiment of the invention will be described. In the embodiment of FIGS. 1-3, the valve assembly of the present invention is utilized with a piston type fluid regulator $R_1$. The regulator $R_1$ may comprise a valve body 1 having a lower body cavity 2, closed at its lower end by threaded plug 3, and an upper body cavity 4 closed at its upper end by a plate or bonnet 5. An annular seal 6 may be provided between the bonnet 5 and body 1 and the bonnet may be held in place by a plurality of studs 7 and nuts 8.

The regulator body 1 is provided with an inlet port or passage 9 and an outlet port or passage 10. Except for the valve assembly, to be later described, and other internal components, the inlet passage 9 would communicate with the outlet passage 10 through body cavities 2 and 4.

Centrally disposed in the valve body 1 for reciprocal movement therein is a tubular stem 11 and an annular piston 12 extending radially therefrom. The outer periphery of piston 12 is provided with an annular seal 13 so that the piston 12 sealingly engages the cylindrical walls of body cavity 4 for limited reciprocal movement therein. A helical spring member 14 may be disposed in the body cavity 4, as shown, so as to bias the piston 12 and stem 11 in an upward direction, as viewed in FIG. 1. However, if the pressure at the outlet 10 is sufficient, the piston 12 and stem 11 will be forced downwardly against the biasing force to the position shown in FIGS. 1 and 2.

The stem 11 is surrounded, within the body cavity 2, by an annular seal 15 and bushing or bearing 16, providing a seal therearound but permitting reciprocal movement of the stem 11. The stem 11 is tubular, being open at its upper end but closed by a wall 17 near its lower end. A downwardly opening cavity 18 may be provided in the stem for receiving spring member 19 which bears against the plug 3 and aids in biasing the stem 11 and piston 12 in an upward direction.

Just above the end wall 17, a section 20 of the walls of the tubular stem 11 may be formed of porous material. A convenient method of providing such a porous section is to weld a high porosity sintered metal cylindrical section between solid wall tubular sections which make up the rest of the stem 11. Although sintered metal formed by powder metalurgical techniques is desirable, any other suitable porous material, metal, plastic, ceramic, etc., that could be bonded to a solid material, could be used. The tubular stem 11 and its porous section 20 can be thought of as a fluid barrier between the inlet 9 and outlet 10 of the regulating valve $R_1$.

A sealing assembly 21 surrounds the stem 11 in the vicinity of the porous section 20 for controlling flow of fluids through the barrier. If the porous section 20 of the barrier is blocked, as shown in FIGS. 1 and 2, fluid communication is prevented between the inlet 9 and outlet 10. If it is unblocked, as shown in FIG. 3, fluid communication is permitted between the inlet 9 and outlet 10, via porous section 20 and the hollow center of stem 10.

The seal assembly 21 is centrally disposed in the body cavity 2 between plug 3 and a retaining shoulder 22. Although it can be made in several ways, the seal assembly 21 may comprise an upper cylindrical member 23 and a lower cylindrical member 24. These two members may be connected by threads 25 for easy assembly and replacement of the seals carried thereby. As shown, inner and outer annular recesses 26 and 27 are provided by this arrangement for the mounting of annular seals 28 and 29. The inner seal 28 sealingly engages stem 11 while the outer seal 29 sealingly engages the surrounding valve body 1.

Another inner recess is formed by this arrangement for mounting of another annular seal which as shown comprises an annular member 30 having an inner cylindrical surface 31 and of a channel-shaped cross section opening in a radially outward direction to receive another annular seal 32 such as one of the O-ring type. The channel-shaped seal element 30 may be formed of TEFLON, other plastics or elastomers or any other suitable material.

As best shown in FIG. 2, when the stem is in its first or closed position (FIGS. 1 and 2), the seal element 30 engages non-porous portions of the stem 11 adjacent opposite ends of the porous section 20. Thus, the flow of fluids through the inlet 9 is blocked from the porous section 20 by the seal element 30, preventing fluid communication between the inlet 9 and outlet 10. When the piston member 12 moves the stem member 11 to a second position, as illustrated by FIG. 3, in response to a drop in differential pressures within the valve $R_1$, at least a portion of the porous section 20 is uncovered so that fluid communication is established between inlet 9 and outlet 10 through the porous section 20 and the longitudinal bore of the tubular stem 11.

The tubular stem 11 and surrounding seal assembly 21 may be thought of as a valve assembly of the regulator $R_1$ comprising a barrier element and a sealing element. The barrier element is the stem 11 and its porous section 20. The barrier element and the sealing element 21 are movable, relative to each other, between a first position, in which fluid flow through the porous section 20 is sealingly blocked, preventing fluid communication between the inlet and outlet 9 and 10, and a second position, in which the porous section 20 is unblocked, permitting fluid communication between the inlet and outlet.

Figure 4:
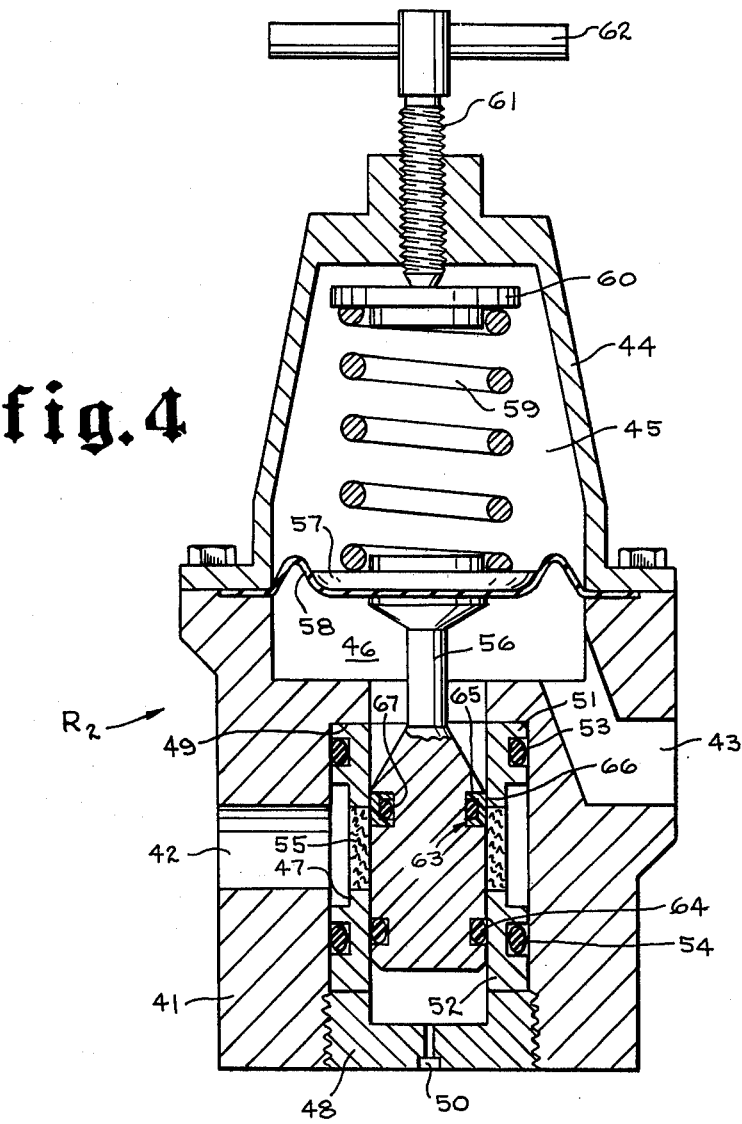
FIG. 4 is an elevation view, in section, of a regulator valve utilizing the valve assembly according to an alternate embodiment of the invention, the valve assembly being in the first or closed position.
Figure 5:
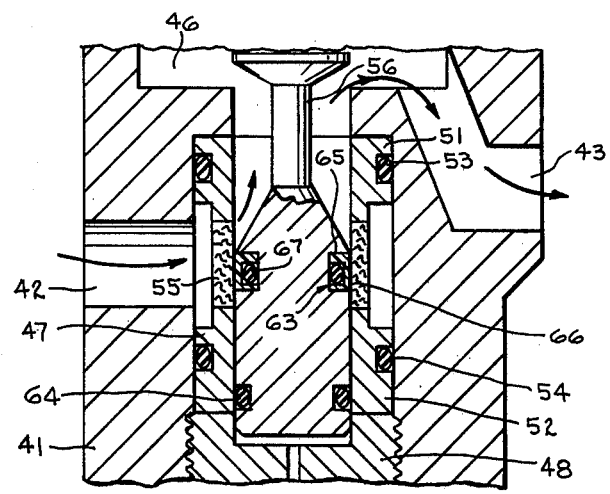
FIG. 5 is a partial elevation view, in section, of the regulator valve of FIG. 4, illustrating the valve assembly in a second or opened position.

Referring now to FIGS. 4 and 5, a regulator valve $R_2$, utilizing an alternate embodiment of the invention, will be described. The regulator $R_2$ comprises a valve body 41 having an inlet port or passage 42 and an outlet port or passage 43. Surmounted on the body 41 is a bonnet 44. The bonnet 44 and body 41 define upper and lower body cavities 45 and 46 which, were it not for intervening components of the regulator $R_2$, would provide fluid communication between the inlet 42 and outlet 43.

Centrally disposed in the lower body cavity 46 is a tubular barrier element 47. The barrier element 47 is retained in position by body plug 48 and a downwardly facing shoulder 49. The body plug 48 may be provided with a vent port 50.

The barrier element 47 may be provided with radial projections or flanges 51 and 52, which in turn provide recesses for annular seals 53 and 54. Between the annular projections 51 and 52, the wall thickness of the barrier element 47 is reduced and provided with a porous portion or section 55. As with the porous section 20 of the stem 11 of the previously described embodiment, the porous section 55 may be conveniently formed by the powder metallurgical process of sintering and then welded or bonded in any suitable fashion between solid wall end sections of the barrier element 47. As mentioned with reference to the previous embodiment, the porous section 55 can be formed of metal, plastic, ceramics, etc., or any other suitable porous materials which can be bonded to adjacent solid materials. Were it not for intervening parts, the porous section 55 of the barrier element 47 would provide fluid communication between the inlet 42 and outlet 43.

Centrally disposed within the valve body 41 for reciprocal movement, relative to barrier element 47 is a cylindrical stem member 56. The stem member 56 may be attached by a plate 57 to a flexible diaphragm 58, the peripheral edges of which are held between the bonnet 44 and body 41. A helical spring 59 may be disposed between the diaphragm plate 57 and an adjustment plate 60 near the upper extremities of bonnet cavity 45. The spring 59 biases the diaphragm 58, and consequently the stem 56, in a downward direction. An adjusting screw 61 to which a hand wheel or rod 62 is attached, may be threaded through the bonnet 44 so as to bear against adjustment plate 60. Movement of the screw 61 adjusts the biasing force applied against the diaphragm plate 57 and diaphragm 58 by spring member 59. Pressure differentials on the stem 56 and diaphragm 58 regulate the movement of stem 56 between a first or closed position, as illustrated in FIG. 4, and a second or open position, as illustrated in FIG. 5.

As illustrated, the lower portion of the stem 56 is cylindrical and of an enlarged diameter for a close sliding fit within the interior of the tubular barrier element 47. The enlarged portion of the stem 56 is provided with a pair of axially or longitudinally spaced annular seals 63 and 64. As illustrated, the lower seal 64 may be simply an annular seal of the O-ring type. The upper seal 63 is similar to the seal 31 in the previously described embodiment and may comprise an annular member 65 having a cylindrical outer surface 66 and a channel-shaped cross section, opening in a radially inward direction for disposition within the channel opening of a resilient annular seal 67 of the O-ring type. The channel shaped member 66 may be of TEFLON, other plastics or elastomers or any other suitable material.

In the first or closed position of FIG. 4, the seals 63 and 64 engage non-porous portions of the barrier element 47 at adjacent opposite ends of the porous section 55, thus blocking the porous section 55 and preventing fluid communication therethrough between inlet 42 and outlet 43. When the differential pressures acting on the stem 56 and diaphragm 58 so dictate, the stem 56 is moved downwardly, from the position of FIG. 4 to a second or open position, illustrated in FIG. 5. In this position, the upper seal 63 moves out of engagement with the solid wall portion of the barrier element 47 adjacent porous section 55 unblocking the porous section and permitting fluid flow therethrough and establishing fluid communication between inlet 42 and outlet 43.

The alternate embodiment therefore illustrates a valve assembly of the invention in which the barrier element surrounds the sealing element carried on a movable stem. In the previously described embodiment, the sealing element is stationarily affixed, relative to the valve body, and surrounds the barrier element which is movably carried on a stem. Of course, other arrangements can be made.

The provision of a porous barrier in combination with a sealing element so as to control flow or pressure of fluids while minimizing unbalanced pressure forces is unique. Such an arrangement is adaptable to a wide range of inlet and outlet pressures because of the balancing of forces and provides low leakage capabilities. Although the valve assembly of the present invention is particularly desirable for use with fluid regulators, it has many other applications.

Two preferred embodiments of the invention have been described herein. Many variations of these embodiments may be made by those skilled in the art without departing from the spirit of the invention. Therefore, it is intended that the scope of the invention be limited only by the claims which follow.

I claim:
1. A fluid regulating valve comprising:
   a valve body having an inlet and outlet and a flow passage for fluid flow therethrough;
   a tubular stem mounted in said body for reciprocal movement between first and second positions;
   barrier means comprising the walls of said tubular stem wherein said walls are of sintered metal throughout a longitudinal section of the tubular stem and constitute a porous portion thereof with the remainder of said tubular member being non-porous;
   piston regulating means connected to said stem for moving said stem between said first and second positions in response to pressures within said valve body
   wherein said sintered porous portion is in said flow passage and fluid communication is established between said inlet and outlet and through said sintered porous portion and the interior of said tubular stem when said stem is in said first position and fluid communication is blocked when said stem is in said second position with the non-porous portion of said tubular member interposed in said flow path,
   said regulating means comprising an annular piston element connected to said tubular stem, and
   spring means mounted in said valve body for exerting a force against said piston element to bias said tubular stem towards said first position, said piston element being responsive to said spring means and the fluid pressure at said outlet for moving said stem between said first and second positions,
   a sealing assembly comprising at least one annular sealing element disposed within said valve body in sealing engagement with the exterior of said tubular member, said annular sealing element comprising an inner cylindrical surface of greater longitudinal axial dimension than said sintered porous portion and sealingly engaging the non-porous portion of said tubular member at adjacent ends of said porous portion when said tubular stem is in said second position, said annular sealing element preventing fluid communication between said inlet and outlet when said tubular member is in said second position and said sintered porous portion is sealingly blocked from said flow passage by said sealing element but permitting said fluid communication when said tubular element is in said first position and said sintered porous portion is disposed in said flow passage whereby a balanced pressure gradient exists across said sintered porous portion when there is fluid flow and substantially balanced forces act on said valve within a wide range of inlet and outlet pressures.

2. The combination of claim 1 in which said annular seal cylindrical surface is carried on a member having a channel-shaped cross-section opening in a radially outward direction, another annular seal being disposed within said channel opening sealingly engaging said channel-shaped member and a surrounding portion of said sealing element.

* * * * *